(12) United States Patent
Liss et al.

(10) Patent No.: US 11,929,934 B2
(45) Date of Patent: Mar. 12, 2024

(54) RELIABLE CREDIT-BASED COMMUNICATION OVER LONG-HAUL LINKS

(71) Applicant: MELLANOX TECHNOLOGIES, LTD., Yokneam (IL)

(72) Inventors: Liran Liss, Atzmon-Segev (IL); Ortal Bashan, Tel Aviv (IL); Aviad Levy, Yavne (IL); Lion Levi, Yavne (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 44 days.

(21) Appl. No.: 17/730,246

(22) Filed: Apr. 27, 2022

(65) Prior Publication Data

US 2023/0353499 A1    Nov. 2, 2023

(51) Int. Cl.
*H04L 47/10* (2022.01)
(52) U.S. Cl.
CPC .................. *H04L 47/39* (2013.01)
(58) Field of Classification Search
CPC ... H04L 12/4633; H04L 47/10; H04L 47/193; H04L 47/30; H04L 47/263; H04L 47/265; H04L 49/90; H04L 2212/00
See application file for complete search history.

(56) References Cited

U.S. PATENT DOCUMENTS

| | | | |
|---|---|---|---|
| 6,922,408 B2 | 7/2005 | Bloch et al. |
| 7,461,210 B1 | 12/2008 | Wentzlaff et al. |
| 7,539,845 B1 | 5/2009 | Wentzlaff et al. |
| 7,620,791 B1 | 11/2009 | Wentzlaff et al. |
| 7,624,248 B1 | 11/2009 | Wentzlaff et al. |
| 7,668,979 B1 | 2/2010 | Wentzlaff |
| 7,774,579 B1 | 8/2010 | Wentzlaff et al. |
| 7,793,074 B1 | 9/2010 | Wentzlaff et al. |
| 7,805,577 B1 | 9/2010 | Mattina et al. |
| 8,127,111 B1 | 2/2012 | Wentzlaff et al. |

(Continued)

FOREIGN PATENT DOCUMENTS

| | | |
|---|---|---|
| CN | 107153624 B | 9/2017 |
| DE | 102021209842 A1 | 3/2022 |

OTHER PUBLICATIONS

Infiniband Trade Association, "InfiniBand™ Architecture Specification", vol. 1, Release 1.3, pp. 1-1842, Mar. 3, 2015.

*Primary Examiner* — Kan Yuen
(74) *Attorney, Agent, or Firm* — Kligler & Associates Patent Attorneys Ltd.

(57) ABSTRACT

A communication apparatus includes input circuitry, an encapsulator, transmission circuitry and flow control circuitry. The input circuitry is to receive packets from a data source in accordance with a first communication protocol that employs credit-based flow control. The encapsulator is to buffer the packets in a memory buffer and to encapsulate the buffered packets in accordance with a second communication protocol. The transmission circuitry is to transmit the encapsulated packets over a communication link in accordance with the second communication protocol. The flow control circuitry is to receive from the encapsulator buffer status indications that are indicative of a fill level of the memory buffer, and to exchange credit messages with the data source, in accordance with the credit-based flow control of the first communication protocol, responsively to the buffer status indications.

25 Claims, 5 Drawing Sheets

(56) References Cited

U.S. PATENT DOCUMENTS

| | | |
|---|---|---|
| 8,190,855 B1 | 5/2012 | Ramey et al. |
| 8,620,940 B1 | 12/2013 | Hostetter et al. |
| 8,635,378 B1 | 1/2014 | Wentzlaff |
| 8,738,860 B1 | 5/2014 | Griffin et al. |
| 8,867,356 B2 | 10/2014 | Bloch et al. |
| 8,924,605 B2 | 12/2014 | Hayut et al. |
| 8,959,265 B2 | 2/2015 | Hayut et al. |
| 8,982,703 B2 | 3/2015 | Almog et al. |
| 8,989,011 B2 | 3/2015 | Ravid et al. |
| 9,213,652 B1 | 12/2015 | Miao et al. |
| 9,325,641 B2 | 4/2016 | Haramaty et al. |
| 9,582,440 B2 | 2/2017 | Gabbay et al. |
| 9,639,487 B1 | 5/2017 | Wentzlaff et al. |
| 9,673,934 B2 | 6/2017 | Mula et al. |
| 9,787,612 B2 | 10/2017 | Steele et al. |
| 9,934,010 B1 | 4/2018 | Griffin et al. |
| 10,057,017 B2 | 8/2018 | Mula et al. |
| 10,200,294 B2 | 2/2019 | Shpiner et al. |
| 10,230,652 B2 | 3/2019 | Haramaty et al. |
| 10,339,059 B1 | 7/2019 | Mattina |
| 10,389,646 B2 | 8/2019 | Zdornov et al. |
| 10,581,762 B2 | 3/2020 | Shpiner et al. |
| 10,642,775 B1 | 5/2020 | Voks et al. |
| 10,831,694 B1 | 11/2020 | Ganor et al. |
| 10,880,236 B2 | 12/2020 | Levi et al. |
| 11,088,966 B2 | 8/2021 | Menachem et al. |
| 11,184,439 B2 | 11/2021 | Eran et al. |
| 2004/0252685 A1 | 12/2004 | Kagan et al. |
| 2005/0063305 A1* | 3/2005 | Wise ............... H04L 47/39 370/235 |
| 2005/0228900 A1* | 10/2005 | Stuart ............... H04L 47/39 709/234 |
| 2007/0211741 A1 | 9/2007 | Kagan et al. |
| 2008/0056300 A1* | 3/2008 | Williams ............ H04L 69/22 370/466 |
| 2012/0082164 A1* | 4/2012 | Bloch ............... H04L 12/5601 370/394 |
| 2013/0250760 A1 | 9/2013 | Sela et al. |
| 2014/0129741 A1 | 5/2014 | Shahar et al. |
| 2014/0208094 A1* | 7/2014 | Rajsic ............. H04L 63/0428 713/152 |
| 2014/0269711 A1* | 9/2014 | Ravid .............. H04L 47/39 370/409 |
| 2015/0103667 A1 | 4/2015 | Elias et al. |
| 2015/0212817 A1 | 7/2015 | Raikin et al. |
| 2016/0021016 A1 | 1/2016 | Haramaty et al. |
| 2016/0028613 A1 | 1/2016 | Haramaty et al. |
| 2016/0285776 A1 | 9/2016 | Gaist et al. |
| 2017/0094593 A1* | 3/2017 | Deng ............... H04W 52/02 |
| 2017/0289066 A1 | 10/2017 | Haramaty et al. |
| 2018/0019947 A1 | 1/2018 | Shpiner et al. |
| 2018/0026878 A1 | 1/2018 | Zahavi et al. |
| 2021/0006502 A1* | 1/2021 | Zhou ............... H04L 47/12 |
| 2021/0250300 A1 | 8/2021 | Mula et al. |
| 2022/0116473 A1 | 4/2022 | Levi et al. |
| 2022/0311715 A1* | 9/2022 | Schubert ............ H04L 45/44 |
| 2022/0358002 A1* | 11/2022 | Zhong ............. G06F 9/546 |
| 2023/0101268 A1* | 3/2023 | Zolotow ........... H04L 47/12 370/235 |

* cited by examiner

RELIABLE CREDIT-BASED COMMUNICATION OVER LONG-HAUL LINKS

FIELD OF THE INVENTION

The present invention relates generally to data communication, and particularly to methods and systems for communication over long-haul communication links.

BACKGROUND OF THE INVENTION

Various use-cases and applications require transporting communication packets over long-haul communication links, e.g., links spanning tens of kilometers or more. Communication over long-haul links is required, for example, when connecting branch offices to a central office, or when connecting a primary site to a remote backup site, to name only two examples.

SUMMARY OF THE INVENTION

An embodiment of the present invention that is described herein provides a communication apparatus including input circuitry, an encapsulator, transmission circuitry and flow control circuitry. The input circuitry is to receive packets from a data source in accordance with a first communication protocol that employs credit-based flow control. The encapsulator is to buffer the packets in a memory buffer and to encapsulate the buffered packets in accordance with a second communication protocol. The transmission circuitry is to transmit the encapsulated packets over a communication link in accordance with the second communication protocol. The flow control circuitry is to receive from the encapsulator buffer status indications that are indicative of a fill level of the memory buffer, and to exchange credit messages with the data source, in accordance with the credit-based flow control of the first communication protocol, responsively to the buffer status indications.

In some embodiments, the flow control circuitry is to exchange the credit messages irrespective of actual transmission of the packets over the communication link. In some embodiments, a round-trip delay over the communication link is larger than a maximal round-trip delay supported by the credit-based flow control of the first communication protocol.

In an example embodiment, the first communication protocol is InfiniBand. In a disclosed embodiment, the second communication protocol is Remote Direct Memory Access over Converged Ethernet (RoCE). In another embodiment, the second communication protocol is Transmission Control Protocol (TCP). In an embodiment, the packets received from the data source are layer-2 packets, and the encapsulator is to encapsulate the buffered layer-2 packets onto a layer-4 transport.

In some embodiments, the transmission circuitry is to encrypt the encapsulated packets prior to transmission over the communication link. In an example embodiment, the transmission circuitry is to apply layer-3 encryption to the encapsulated packets.

In some embodiments, the apparatus further includes a management module, to receive network-topology messages via the input circuitry, and to forward the network-topology messages transparently over the communication link for processing by a peer communication apparatus. In other embodiments, the apparatus further includes a management module, to receive network-topology messages via the input circuitry, and to process the network-topology messages locally so as to present the communication apparatus as a managed network device.

In an embodiment, the packets are associated with multiple flows, and the encapsulator is to preserve an order of the packets within a given flow, and to permit deviation from the order between packets associated with different flows. In an embodiment, the packets are associated with multiple quality-of-service (QoS) classes, and the flow control circuitry is to exchange the credit messages independently for each of the QoS classes.

There is additionally provided, in accordance with an embodiment that is described herein, a communication method including receiving packets from a data source in accordance with a first communication protocol that employs credit-based flow control. The packets are buffered in a memory buffer, and the buffered packets are encapsulated in accordance with a second communication protocol. Buffer status indications, which are indicative of a fill level of the memory buffer, are received. Credit messages are exchanged with the data source in accordance with the credit-based flow control of the first communication protocol, responsively to the buffer status indications. The encapsulated packets are transmitted over a communication link in accordance with the second communication protocol.

There is further provided, in accordance with an embodiment that is described herein, a method for communication over a long-haul communication link. The method includes receiving layer-2 packets from a data source. The layer-2 packets are buffered in a memory buffer, and the buffered layer-2 packets are encapsulated in accordance with a layer-4 transport protocol. The encapsulated layer-2 packets are transmitted over the long-haul communication link in accordance with the layer-4 transport protocol.

The present invention will be more fully understood from the following detailed description of the embodiments thereof, taken together with the drawings in which:

DETAILED DESCRIPTION OF EMBODIMENTS

Overview

Figure 1:
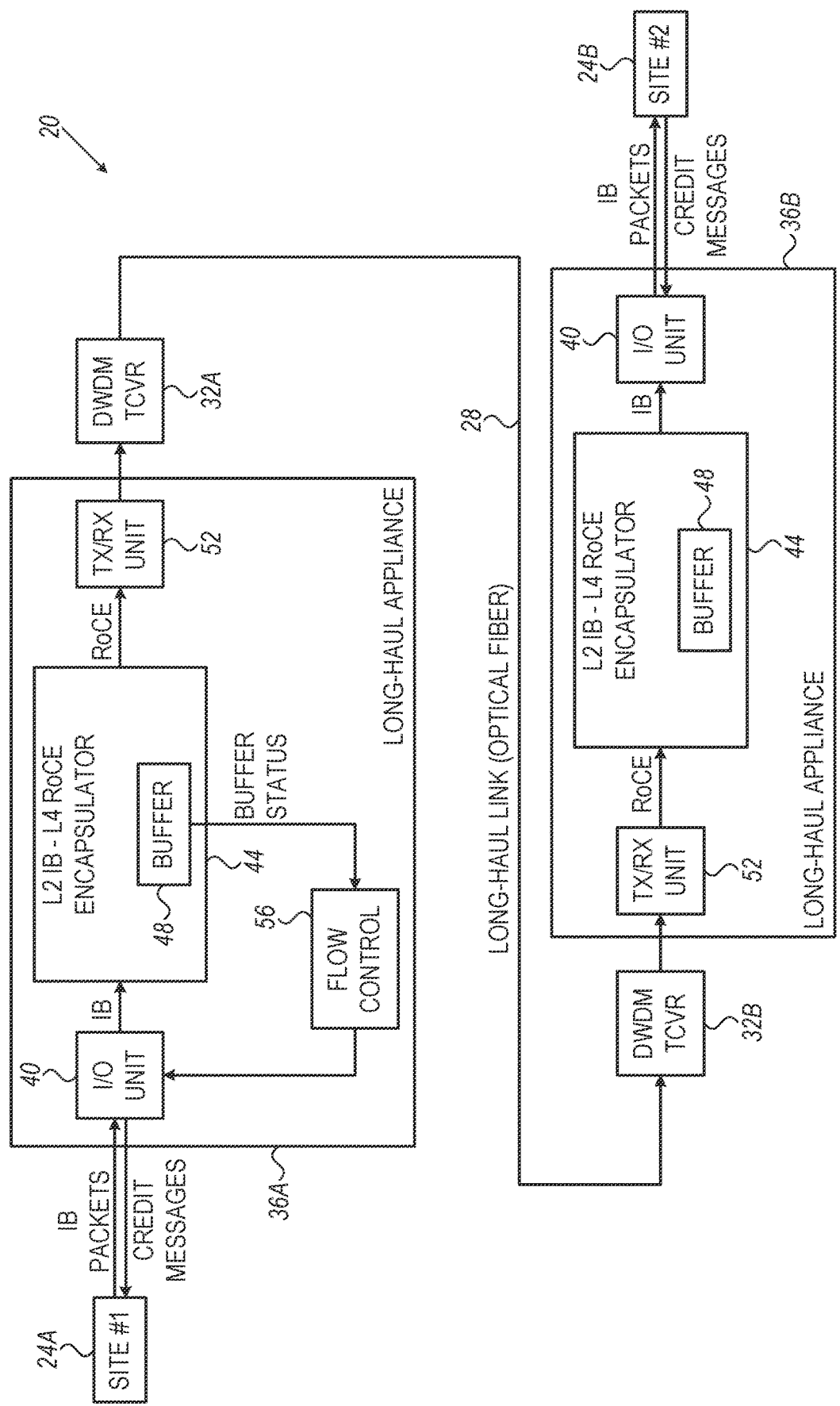
FIG. 1 is a block diagram that schematically illustrates a long-haul communication network, in accordance with an embodiment of the present invention.

Communication over long-haul links is challenging for communication protocols that use link-level flow control mechanisms, due the sensitivity of these protocols to the Round-Trip Time (RTT) of the link. Embodiments of the present invention that are described herein provide improved methods and systems for reliable communication over long-haul links. The embodiments described herein refer mainly to InfiniBand (IB) networks that employ link-level, credit-based flow control. The disclosed techniques, however, are applicable to various other suitable communication protocols and flow control mechanisms. The description that follows will refer to IB by way of example.

In some embodiments, an IB communication network is split between two sites that are connected by a long-haul link. In an example embodiment, the length of the long-haul link is on the order of tens of kilometers, e.g., 40 km. Typically, although not necessarily, the round-trip delay of such a link is longer than the maximal delay supported by the link-level flow control mechanism specified in IB.

In order to communicate reliably and efficiently over the long-haul link, the network further comprises two long-haul communication appliances, one at either end of the link. Each long-haul communication appliance (referred to below as "appliance" for brevity) receives layer-2 IB packets for transmission over the long-haul link. The appliance buffers the IB packets in a memory buffer, and encapsulates the buffered packets in accordance with a layer-4 transport protocol such as RDMA-over-Converged Ethernet (RoCE) or Transmission Control Protocol (TCP). The appliance transmits the encapsulated packets over the long-haul link, in accordance with the layer-4 transport protocol, to the peer appliance. The peer appliance performs the reverse operations, i.e., buffers the packets received over the long-haul link, decapsulates them and outputs the reproduced layer-2 IB packets.

In addition to performing buffering and encapsulation, each appliance also serves as a termination point for the IB credit-based flow control mechanism. In some embodiments, the appliance assesses the fill level of its memory buffer, and exchanges IB credit messages according to the buffer fill level. In this manner, end-to-end transmission over the long-haul link remains reliable (lossless), even though its link layer (layer-2) may be lossy.

In some embodiments, the disclosed appliances perform additional functions, such as layer-3 encryption and decryption of the packets they transport over the long-haul link.

Various architectures and implementations of the disclosed long-haul communication appliances are described herein. In some embodiments, each appliance is viewed and managed by the network (e.g., by the IB Subnet Manager (SM)) as a two-port switch. In other embodiments, the pair of appliances and the long-haul link are made transparent to the network management.

The traffic sent over the long-haul link typically comprises multiple packet flows. In some embodiments, different flows are associated with different Quality-of-Service (QoS) classes, and the appliance exchanges credit messages independently for each QoS class. In an example embodiment, packets are tagged with Service Levels (SLs), different SLs are assigned different Virtual Lanes (VLs), and the appliance performs buffering and flow-control management independently per VL.

In some implementations, the disclosed appliance comprises multiple processing cores that operate in parallel. Each core buffers, encapsulates and transmits the IB packets assigned thereto, and also terminates the credit-based flow control. Traffic is assigned to the cores on the basis of flows, such that all the IB packets of a given flow are processed by the same core. A given core preserves the order of packets within each flow. Between different cores, which by-definition process different flows, there is no need to preserve the packet order. As such, the cores can operate independently of one another.

System Description

FIG. 1 is a block diagram that schematically illustrates a long-haul communication network 20, in accordance with an embodiment of the present invention. Network 20 is split between two sites 24A and 24B (also referred to as "site #1" and "site #2"). Each site typically comprises multiple end-points and network devices, e.g., IB switches.

Sites 24A and 24B are connected by a long-haul communication link 28. In the present example, link 28 comprises an optical fiber. Two Dense wavelength division multiplexing (DWDM) transceivers 32A and 32B transmit and receive optical signals over the fiber. In an example embodiment, link 28 is on the order of 40 km long. Alternatively, however, link 28 may have any other suitable length. The examples described herein refer mainly to long-haul links, on the order of tens of km, but the disclosed techniques are applicable to short links, as well, and generally to links of any length.

In order to provide reliable and efficient IB connectivity across link 28, network 20 comprises two long-haul communication appliances 36A and 36B that are coupled at the two ends of the link. Appliances 36A and 36B communicate bidirectionally, i.e., transfer traffic both from site #1 to site #2 and from site #2 to site #1. For clarity, the figure and accompanying description focus on communication from site #1 to site #2.

In the present example, appliance 36A comprises an Input/Output (I/O) unit 40, an encapsulator 44, a memory buffer 48, a Transmit/Receive (TX/RX) unit 52, and a flow control module 56. I/O unit 40 (also referred to as "input circuitry") receives layer-2 IB packets from a data source in site 24A, for transmission over link 28 to site 24B. In the present context, the term "data source" refers to the network device that sends the IB packets to appliance 36A and exchanges flow control messages with appliance 36A. In practice, the data source is often not the initial originator of the packets, but rather the last network device (e.g., switch) in site 24A that is connected directly to (i.e., that is a link partner of) appliance 36A.

I/O unit 40 sends the layer-2 IB packets to encapsulator 44. Encapsulator 44 buffers the IB packets in memory buffer 48. Typically, the buffering operation concatenates the entire IB packets, including headers and payloads, one after the other in buffer 48.

After buffering a sufficient amount of data (e.g., a sufficient number of IB packets) in buffer 48, encapsulator 44 encapsulates the buffered IB packets in accordance with a suitable layer-4 transport protocol. The encapsulation typically involves adding one or more headers of the layer-4 transport protocol to a group of packets, so as to produce a packet of the layer-4 transport protocol.

In the present example the layer-4 transport protocol is the Remote Direct Memory Access over Converged Ethernet (RoCE) protocol, by way of non-limiting example. In alternative embodiments, the layer-4 transport protocol may comprise the Transmission Control Protocol (TCP), or any other suitable protocol.

In the embodiment of FIG. 1, the output of encapsulator 44 comprises a sequence of RoCE packets. TX/RX unit 52 (also referred to as "transmission circuitry") sends the RoCE packets to DWDM transceiver 32A, for transmission over link 28.

As noted above, appliance 36A also serves as a termination point for the IB credit-based flow control mechanism. This task is performed by flow control module 56 (also referred to as "flow control circuitry"). In some embodiments, flow control module 56 assesses the fill level of buffer 48 (e.g., by receiving, from encapsulator 44, buffer status messages that indicate the buffer fill level).

Flow control module 56 instructs I/O Unit 40 to pause reception of IB packets based on the fill level of buffer 48. In turn, I/O Unit 40 throttles sending of credits to the data source. The number of credits sent to the data source typically increases as buffer 48 offers more room, and decreases as buffer 48 is exhausted. However, the number of outstanding credits is not directly related to the size of buffer 48, which has to account for the amount of in-flight data in the long-haul link. In this manner, flow control module 56 throttles the data rate of incoming IB packets, so as to avoid overflow in buffer 48 and best exploit the bandwidth of link 28. Flow control over link 28 is managed by the L4 transport protocol.

At the opposite end of link 28, the sequence of RoCE packets is received by DWDM transceiver 32B and provided to appliance 36B. In appliance 36B, TX/RX unit 52 receives the RoCE packets and provides them to encapsulator 44. (In the present context, the term "encapsulator" refers to a unit that performs encapsulation, decapsulation, or both.) Encapsulator 44 buffers the RoCE packets in memory buffer 48, decapsulates each RoCe packet to extract the original layer-2 IB packets, and provides the IB packets to I/O unit 40. I/O unit 40 outputs the IB packets to a network device (e.g., the next-hop IB switch) according to available credits in site 24B, from which the IB packets are forwarded to their destinations.

As noted above, the description of FIG. 1 focuses on communication from site 24A to site 24B, for the sake of clarity. In practice, appliances 36A and 36B are typically symmetrical, and conduct bidirectional communication between sites 24A and 24B. Communication from site 24B to site 24A is performed in a similar manner to the above description, with the roles of appliances 36A and 36B reversed.

From a network management standpoint, the switching fabric that includes appliances 36A and 36B (and in some cases the entire network 20 including both sites 24A and 24B) is managed as a single IB subnet having a single Subnet Manager (SM). System 20 as a whole may comprise additional subnets, on either side of the long-haul link. Such additional subnets are separated by routers from the subnet comprising appliances 36A and 36B, as well as from one another. Network management aspects are addressed further below with reference to FIGS. 4A and 4B.

Figure 2:
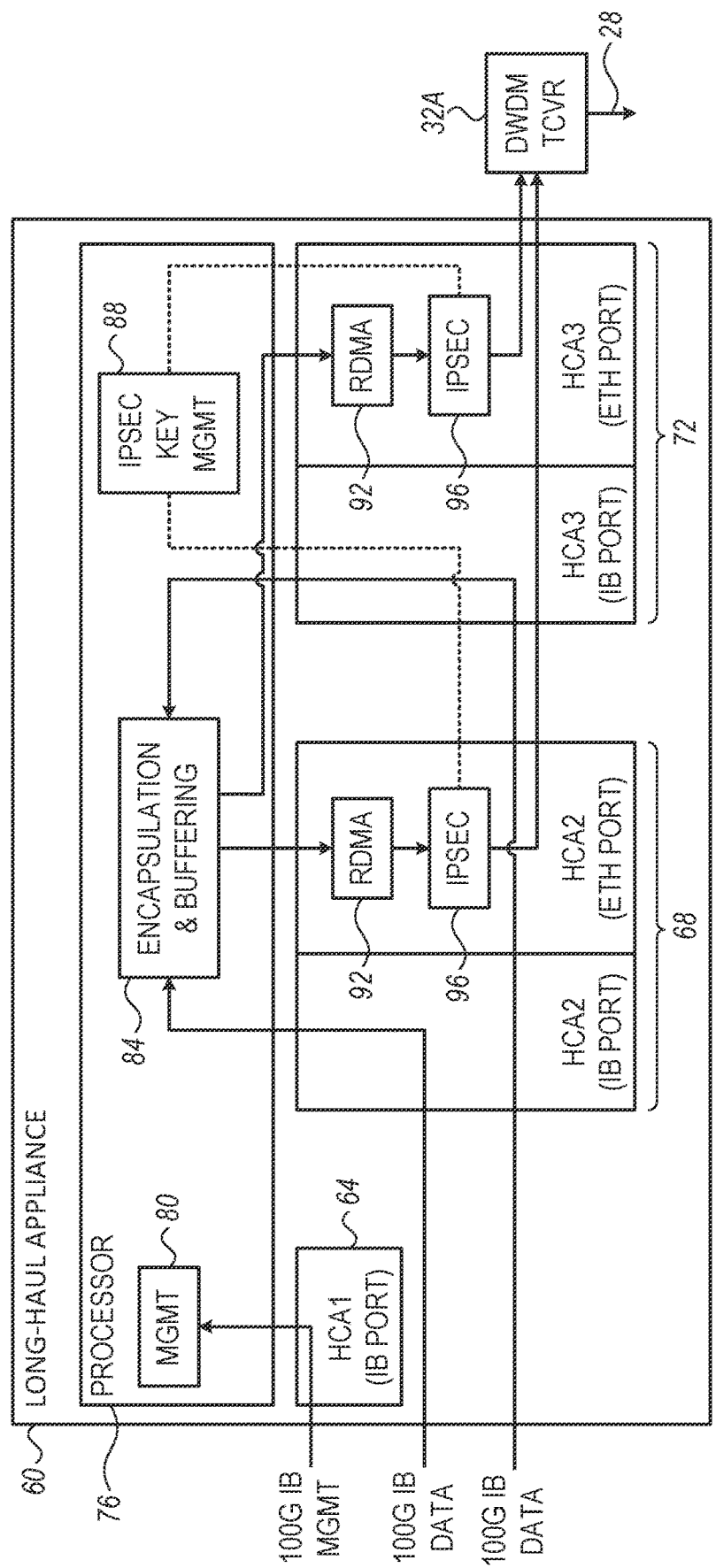
FIG. 2 is a block diagram that schematically illustrates an example implementation of a long-haul communication appliance, in accordance with an embodiment of the present invention.

FIG. 2 is a block diagram that schematically illustrates an example implementation of a long-haul communication appliance 60, in accordance with an embodiment of the present invention. The configuration seen in FIG. 2 can be used for implementing appliances 36A and 36B of FIG. 1, for example.

In the present example, appliance 60 is implemented using three IB Host Channel Adapters (HCAs) denoted HCA1 (64), HCA2 (68) and HCA3 (72), and a processor 76 that runs suitable software. HCA1 comprises at least one IB port. HCA2 and HCA3 each comprises at least one IB port and at least one Ethernet port.

The software running on processor 76 comprises a management module 80, an encapsulation & buffering module 84, and an IPSEC key management module 88. In some embodiments, processor 76 comprises multiple processing cores that operate in parallel on different packet flows. Aspects of parallel processing are addressed further below with reference to FIG. 5.

Appliance 60 receives as input two 100 G IB data streams (streams of layer-2 IB packets), and a 100 G IB management stream (a stream of management messages). The management stream is handled by HCA1, one data stream is handled by HCA2, and the other data stream is handled by HCA3.

HCA1 receives the management stream via an IB port, and diverts the management messages to management module 80 running in processor 76. Management module performs the various management tasks of appliance 60. Example management aspects are discussed below, with reference to FIGS. 4A and 4B.

HCA2 receives its respective data stream via an IB port, and places raw IB packets (with the exception of credit-related messages) in memory for processing by encapsulation & buffering module 84 in processor 76. Module 84 buffers the IB packets, encapsulates the IB packets in RoCE messages, and posts the RoCE messages to HCA2. HCA2 comprises an RDMA module 92 that transmits the message with corresponding RoCE packets. HCA2 outputs the RoCE packets over an Ethernet port to DWDM transceiver 32A, for transmission over long-haul link 28. In addition, HCA2 terminates the IB flow control mechanism, i.e., throttles the rate of incoming IB packets by exchanging credit messages with the data source via the IB port. In parallel, HCA3 performs similar tasks to HCA2, on the second 100 G data stream.

In an embodiment, HCA2 and HCA3 each comprises a respective Internet Protocol Security (IPSEC) module 96 that encrypts the RoCE packets in layer-3 prior to transmission. IPSEC key management module 88 in processor 76 provides suitable cryptographic keys to IPSEC modules 96. Module 88 may obtain the keys from a suitable local management service or Quantum Key Distribution (QKD) service, e.g., over 1 G or 10 G Ethernet.

The example of FIG. 2 focuses on the transmit-side functions of appliance 60 (functions relating to transmitting data over link 28), for the sake of clarity. Typically, appliance 60 also performs reception functions (functions relating to receiving data over link 28) in parallel. On reception, too, HCA1 is responsible for management in cooperation with management module 80, and HCA2 and HCA3 are each responsible for handling a respective data stream.

HCA2 receives a stream of RoCE packets from DWDM transceiver 32A, via the Ethernet port. HCA2 receives the RoCE packets using RDMA module 92, decrypts the RoCE packets in layer-3 using IPSEC module 96 (with keys provided by module 88 as explained above), and delivers incoming RoCE messages (comprising encapsulated IB packets) into memory buffers. Encapsulation & buffering module 84 decapsulates the raw IB packets and sends them to HCA2. HCA2 outputs the resulting 100 G IB data stream.

In parallel, HCA3 receives a second stream of RoCE packets from DWDM transceiver 32A, via the Ethernet port, and performs similar tasks to HCA2, on the second stream of RoCE packets.

Figure 3:
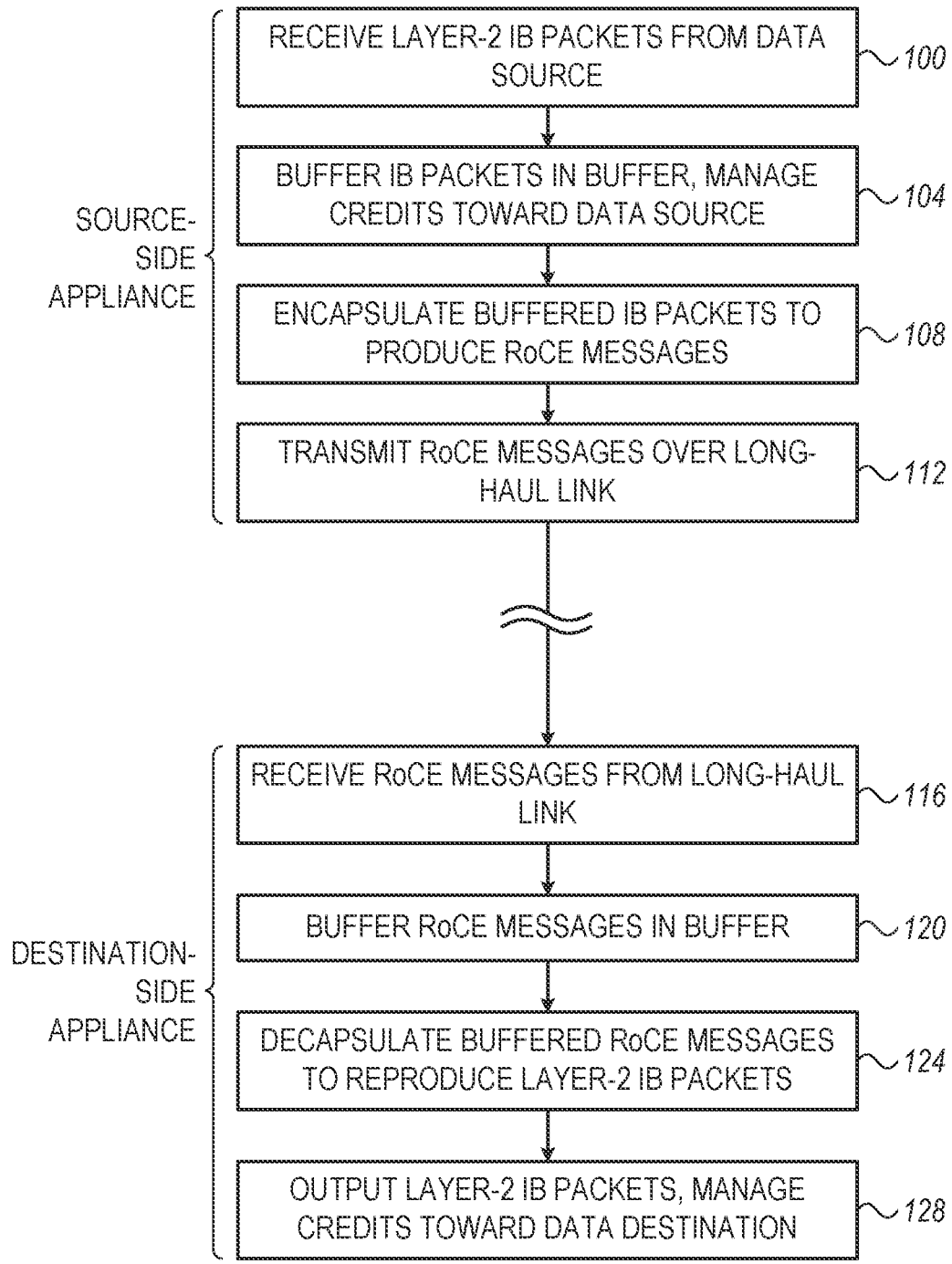
FIG. 3 is a flow chart that schematically illustrates a method for communication over a long-haul link, in accordance with an embodiment of the present invention.

FIG. 3 is a flow chart that schematically illustrates a method for communication over a long-haul link, in accordance with an embodiment of the present invention.

The method begins with I/O unit 40 of a source-side appliance (e.g., appliance 36A of FIG. 1) receiving layer-2 IB packets from a data source, at an input stage 100. Encapsulator 44 of the appliance buffers the IB packets in buffer 48, and manages the credit-based flow control, at a buffering and termination stage 104. At an encapsulation stage 108, encapsulator 44 encapsulates the buffered IB packets to produce RoCE messages. At a transmission stage 112, TX/RX unit 52 of the appliance transmits the RoCE messages (in RoCE packets) over long-haul link 28.

At the opposite side of long-haul link 28, TX/RX unit 52 of a destination-side appliance (e.g., appliance 36B of FIG. 1) receives the RoCE messages, at a reception stage 116. At a buffering stage 120, encapsulator 44 of the destination-side appliance buffers the RoCE messages in buffer 48. At a decapsulation stage 124, encapsulator 44 decapsulates the buffered RoCE messages to reproduce the original layer-2 IB packets. At an output stage 128, encapsulator 44 outputs the stream of IB packets, including management of credit messages toward the next-hop switch.

Management Models

As noted above, from a network management perspective, the switching fabric that includes appliances 36A and 36B (and may include additional elements of sites 24A and 24B) is viewed and managed as a single IB subnet having a single Subnet Manager (SM). In various embodiments, the disclosed long-haul communication appliances can be managed in different ways.

Figure 4A:
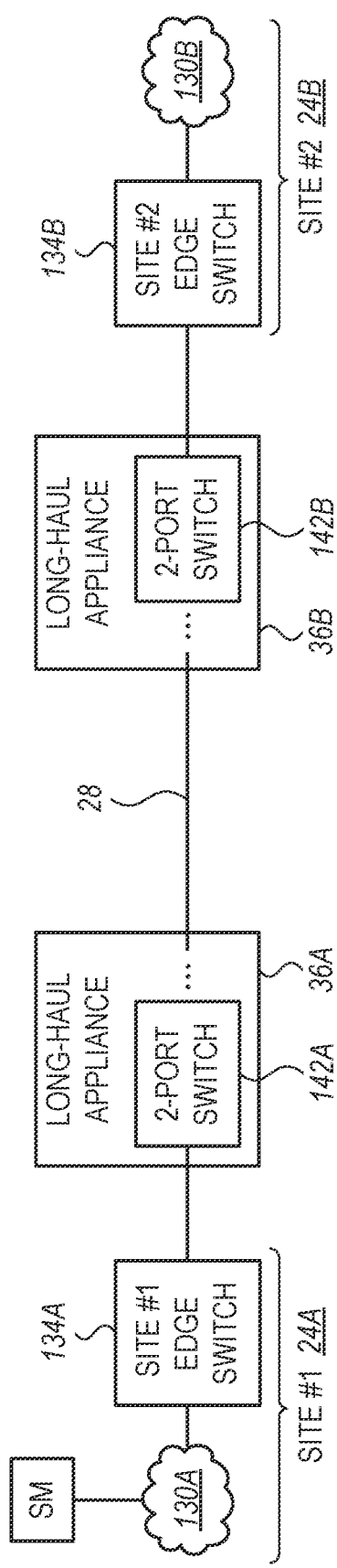
FIGS. 4A and 4B are block diagrams that schematically illustrate alternative management models for a long-haul communication network, in accordance with embodiments of the present invention.

FIG. 4A is a block diagram that schematically illustrates a management model for a long-haul communication network, in accordance with embodiments of the present invention. In this management model, each long-haul appliance is modeled (and viewed and managed by the SM) as a two-port IB switch.

In the present example, site 24A comprises a portion 130A of the network comprising suitable endpoints and network devices, and an edge switch 134A that connects to appliance 36A. In the management model of FIG. 4A, appliance 36A comprises, and presents itself to a SM 138 as, a 2-port switch 142A.

Similarly, site 24B comprises a portion 130B of the network comprising suitable endpoints and network devices, and an edge switch 134B that connects to appliance 36B. Here, too, appliance 36B comprises, and presents itself to SM 138 as, a 2-port switch 142B.

SM 138 manages the IB subnet that comprises appliances 36A and 36B. SM 138 sees logical entities presented to it by the various network elements, in this case switches 142A and 142B. The SM has no other notion of the long-haul appliances. In the example of FIG. 4A SM 138 is located in site 24A, but alternatively the SM may be located in site 24B or at any other suitable location.

In the model of FIG. 4A, when a given long-haul appliance (appliance 36A or 36B) receives IB network-topology messages (e.g., network discovery messages) locally via its I/O unit 40, the appliance processes the network-topology messages as if it were a 2-ported switch. This task is typically performed by the management module of the appliance (e.g., management module 80 of FIG. 2).

Figure 4B:
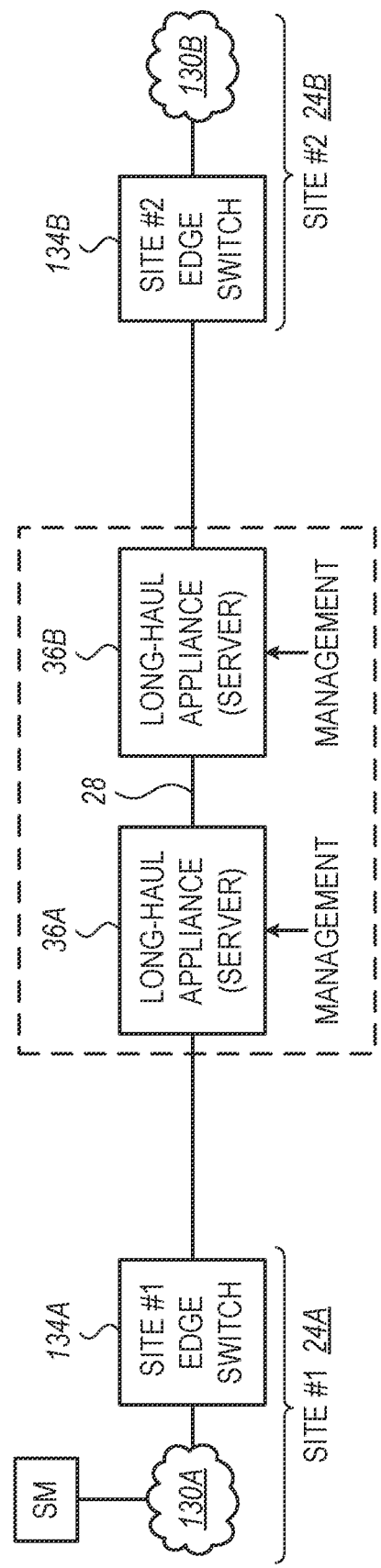

FIG. 4B is a block diagram that schematically illustrates a management model for a long-haul communication network, in accordance with embodiments of the present invention. In this example, appliances 36A and 36B are transparent to SM 138, i.e., the SM 138 is unaware of the existence of the appliances. In other words, from the perspective of SM 138, edge switch 134A (of site 24A) is connected to edge switch 134B (of site 24B) by a direct network link.

In the model of FIG. 4B, when a given long-haul appliance (appliance 36A or 36B) receives IB network-topology messages (e.g., network discovery messages) locally via its I/O unit 40, the appliance forwards the network-topology messages transparently over link 28, for processing by the peer appliance. The peer appliance would typically forward the network-topology messages to the local edge switch (134A or 134B). As a result, appliances 36A and 36B are not visible to SM 138 and not considered part of the network topology.

Each of the management models of FIGS. 4A and 4B has its pros and cons. In the "managed" model of FIG. 4A, the network model is more complex, but on the other hand the appliances can be accounted for and configured by SM 138 similarly to the other network elements. Moreover, in the "managed" model of FIG. 4A, the features of a 2-port IB switch need to be implemented in the long-haul appliance. In the "transparent" model of FIG. 4B, the network model is simpler, but on the other hand the appliances need to be managed and configured by a user, or by some other management system other than the SM.

The management models of FIGS. 4A and 4B are presented by way of example. In alternative embodiments, any other suitable management scheme can be used. For example, a long-haul appliance (e.g., 36A or 36B) can be managed over a separate management link connected to the SM. A scheme of this sort is seen in FIG. 2 above (in which the 100 G management stream handled by HCA1 can utilize such a separate link).

Parallelized Operation Using Multi-Core Appliance

In many practical scenarios, the data rate over long-haul link 28 (and therefore the data rate that needs to be handled by long-haul appliances 36A and 36B) is very high, e.g., on the order of hundreds of Gbps. To meet this requirement, in some embodiments the processors of appliances 36A and 36B (e.g., processor 76 of FIG. 2) comprise multiple processing cores that operate in parallel. The input circuitry of the appliance (e.g., I/O unit 40 in FIG. 1) distributes the incoming IB packets to the processing cores. Each core processes (e.g., buffers, encapsulates or decapsulates, governs flow control, encrypts or decrypts) the packets assigned thereto.

To enable efficient parallelization, the input circuitry of the appliance (e.g., I/O unit 40 in FIG. 1) typically distributes IB packets to processing cores based on flows. The underlying condition is that all the packets of a certain flow will be processed by the same core.

The rationale behind this condition is that typically (i) the appliance needs to preserve the order of packets within each flow, and (ii) no ordering constraint is set on packets belonging to different flows. Therefore, if it is guaranteed that all the packets of a given flow are processed by the same core, the cores can operate independently of one another without synchronization constraints between them. A given core, however, is typically required to preserve the order of packets within any individual flow.

In various embodiments, flows can be defined in various ways. For example, in some embodiments packets having the same Destination Local Identifier (DLID) are considered as belonging to the same flow. In these embodiments the input circuitry assigns all the packets having a given DLID to the same core. Another example attribute that can be used as a flow identifier is the destination Queue Pair (QP).

Additionally or alternatively, the appliance may perform buffering and flow-control termination independently for packets of different QoS classes, e.g., Service Levels (SLs) in IB. This feature is important for meeting the required Service Level Agreement (SLA) specified for each SL.

Figure 5:
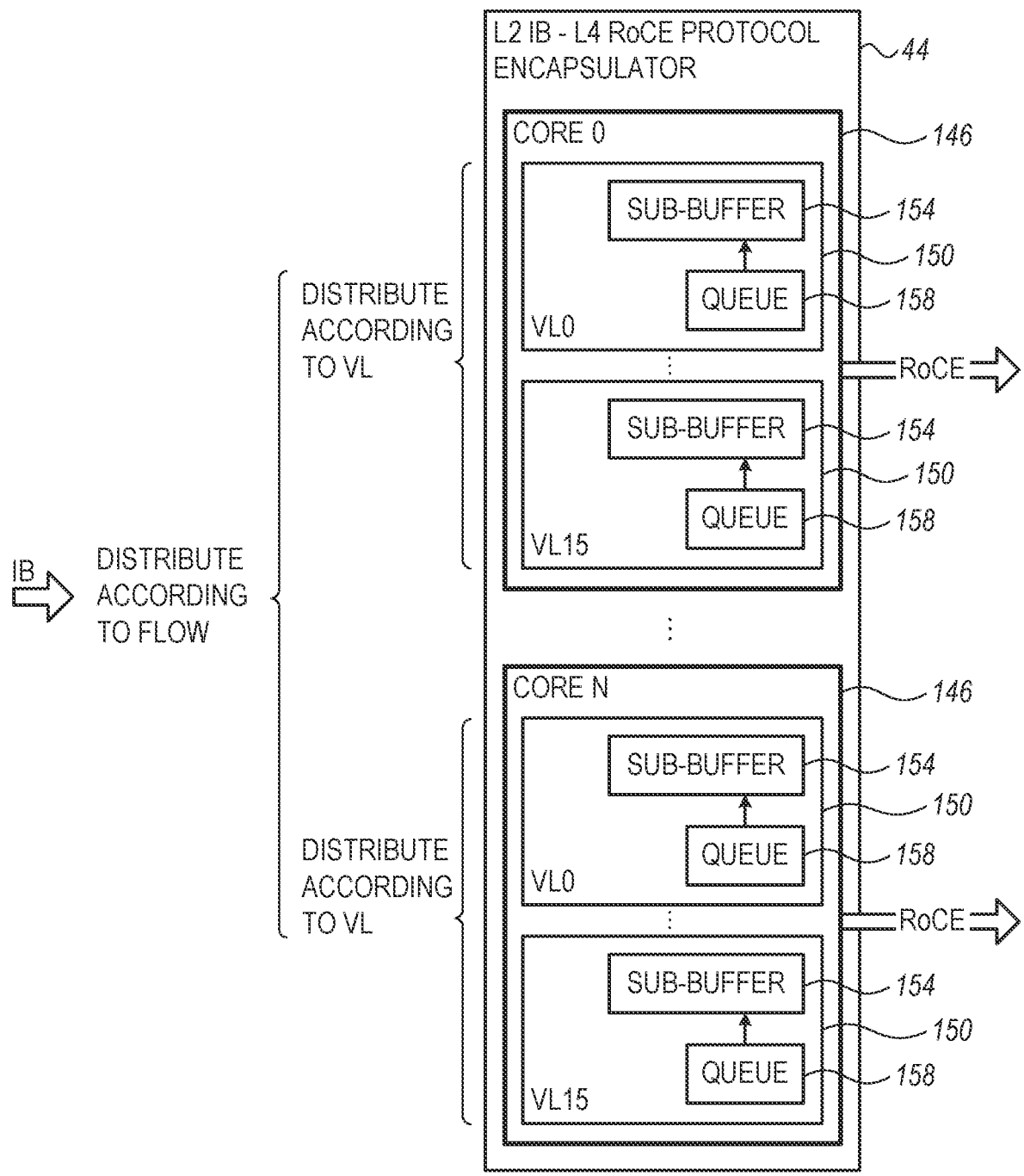
FIG. 5 is a block diagram that schematically illustrates an example implementation of a parallelized multi-core encapsulator of a long-haul communication appliance, in accordance with an embodiment of the present invention.

FIG. 5 is a block diagram that schematically illustrates an example implementation of a parallelized multi-core implementation of encapsulator 44, in accordance with an embodiment of the present invention. The configuration of FIG. 5 meets the above conditions, namely that packets of a given flow are not assigned to different cores, and that buffering and flow-control termination are performed independently per VI.

In the present example, encapsulator 44 comprises N processing cores 146 that operate in parallel. Each core 146 establishes a separate respective RoCE connection with the peer appliance for independent operation. Each core 146 comprises multiple separate buffering & queuing modules 150. Each buffering & queuing module 150 comprises a separate sub-buffer 154 (considered a part of buffer 48) and a separate queue 158. Each buffering & queuing module 150 is assigned to buffer and terminate credit messages for a separate VL.

I/O unit 40 of the appliance (not seen in this figure) assigns IB packets to queues as follows:
  Initially, packets are classified to per-core queue groups based on flows.
  For each per-core queue group, packets are delivered to a specific queue based on their VL mapping.

The configurations of communication network 20 and its various components, such as appliances 36A, 36B and 60 of FIGS. 1 and 2, the networks of FIGS. 4A and 4B, and encapsulator 44 of FIG. 5, are example configurations that are chosen purely for the sake of conceptual clarity. Any other suitable configurations can be used in alternative embodiments. In various embodiments, the disclosed communication appliances can be implemented using hardware, e.g., using one or more Application-Specific Integrated Circuits (ASIC) and/or Field-Programmable Gate Arrays (FPGA), using software, or using a combination of hardware and software components. Memory buffers 48 may be implemented using any suitable memory medium, e.g., Random-Access Memory (RAM).

In some embodiments, certain components of the disclosed appliances may be implemented using a general-purpose processor, which is programmed in software to carry out the functions described herein. The software may be downloaded to the processor in electronic form, over a network, for example, or it may, alternatively or additionally, be provided and/or stored on non-transitory tangible media, such as magnetic, optical, or electronic memory.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A communication apparatus, comprising:
  input circuitry, to receive packets from a data source in accordance with a first communication protocol that employs credit-based flow control;
  an encapsulator, to buffer the packets in a memory buffer and to encapsulate the buffered packets in accordance with a second communication protocol;
  transmission circuitry, to transmit the encapsulated packets over a communication link in accordance with the second communication protocol; and
  flow control circuitry, to receive from the encapsulator buffer status indications that are indicative of a fill level of the memory buffer, and to exchange credit messages with the data source, in accordance with the credit-based flow control of the first communication protocol, responsively to the buffer status indications.

2. The communication apparatus according to claim 1, wherein the flow control circuitry is to exchange the credit messages irrespective of actual transmission of the packets over the communication link.

3. The communication apparatus according to claim 1, wherein a round-trip delay over the communication link is larger than a maximal round-trip delay supported by the credit-based flow control of the first communication protocol.

4. The communication apparatus according to claim 1, wherein the first communication protocol is InfiniBand.

5. The communication apparatus according to claim 1, wherein the second communication protocol is Remote Direct Memory Access over Converged Ethernet (RoCE).

6. The communication apparatus according to claim 1, wherein the second communication protocol is Transmission Control Protocol (TCP).

7. The communication apparatus according to claim 1, wherein the packets received from the data source are layer-2 packets, and wherein the encapsulator is to encapsulate the buffered layer-2 packets onto a layer-4 transport.

8. The communication apparatus according to claim 1, wherein the transmission circuitry is to encrypt the encapsulated packets prior to transmission over the communication link.

9. The communication apparatus according to claim 8, wherein the transmission circuitry is to apply layer-3 encryption to the encapsulated packets.

10. The communication apparatus according to claim 1, and comprising a management module, to receive network-topology messages via the input circuitry, and to forward the network-topology messages transparently over the communication link for processing by a peer communication apparatus.

11. The communication apparatus according to claim 1, and comprising a management module, to receive network-topology messages via the input circuitry, and to process the network-topology messages locally so as to present the communication apparatus as a managed network device.

12. The communication apparatus according to claim 1, wherein the packets are associated with multiple flows, and wherein the encapsulator is to preserve an order of the packets within a given flow, and to permit deviation from the order between packets associated with different flows.

13. The communication apparatus according to claim 1, wherein the packets are associated with multiple quality-of-service (QoS) classes, and wherein the flow control circuitry is to exchange the credit messages independently for each of the QoS classes.

14. A communication method, comprising:
  receiving packets from a data source in accordance with a first communication protocol that employs credit-based flow control;

buffering the packets in a memory buffer and encapsulating the buffered packets in accordance with a second communication protocol;

receiving buffer status indications that are indicative of a fill level of the memory buffer, and exchanging credit messages with the data source in accordance with the credit-based flow control of the first communication protocol, responsively to the buffer status indications; and transmitting the encapsulated packets over a communication link in accordance with the second communication protocol, wherein a round-trip delay over the communication link is larger than a maximal round-trip delay supported by the credit-based flow control of the first communication protocol.

15. The communication method according to claim 14, wherein exchanging the credit messages is performed irrespective of actual transmission of the packets over the communication link.

16. The communication method according to claim 14, wherein the first communication protocol is InfiniBand.

17. The communication method according to claim 14, wherein the second communication protocol is Remote Direct Memory Access over Converged Ethernet (RoCE).

18. The communication method according to claim 14, wherein the second communication protocol is Transmission Control Protocol (TCP).

19. The communication method according to claim 14, wherein the packets received from the data source are layer-2 packets, and wherein encapsulating the buffered packets comprises encapsulating the buffered layer-2 packets onto a layer-4 transport.

20. The communication method according to claim 14, further comprising encrypting the encapsulated packets prior to transmission over the communication link.

21. The communication method according to claim 20, wherein encrypting the encapsulated packets comprises applying layer-3 encryption to the encapsulated packets.

22. The communication method according to claim 14, further comprising receiving network-topology messages and forwarding the network-topology messages transparently over the communication link.

23. The communication method according to claim 14, further comprising receiving network-topology messages and processing the network-topology messages locally so as to present a managed network device.

24. The communication method according to claim 14, wherein the packets are associated with multiple flows, and wherein transmitting the encapsulated packets comprises preserving an order of the packets within a given flow, and permitting deviation from the order between packets associated with different flows.

25. The communication method according to claim 14, wherein the packets are associated with multiple quality-of-service (QoS) classes, and wherein exchanging the credit messages is performed independently for each of the QoS classes.

* * * * *